(12) United States Patent
Laméris et al.

(10) Patent No.: US 11,040,491 B2
(45) Date of Patent: Jun. 22, 2021

(54) SYSTEMS AND METHODS FOR IDENTIFYING THREE-DIMENSIONAL PRINTED OBJECTS

(71) Applicant: Shapeways, Inc., New York, NY (US)

(72) Inventors: Daphne Marlies Laméris, Eindhoven (NL); Jop Antonius Van Rooij, Lunetten (NL); Thomas de Wolf, Amsterdam (NL); Laurus Augustinus Hilte, Wageningen (NL); Tiago André Costa São José, Eindhoven (NL); Sebastien Boutard, Bergen op Zoom (NL); Elena Korina Koutsiota, Eindhoven (NL); Jelmer Johan Siekmans, Jelmer (NL); Maarten van Dijk, Eindhoven (NL); Matthew Philip Boyle, Astoria, NY (US); Zachary Hansen Dillon, New York, NY (US); Edward Kurt Summers, Forest Hills, NY (US); Bram van Zandvoort, Twello (NL); Fábio Martins Moreira, Eindhoven (NL); Lucia Henriëtta Petronella Leenders, Geldrop (NL); Jules Witte, Eindhoven (NL); Hans Louis Robert Lambermont, Eindhoven (NL); Stefan Rink, Sterksel (NL); Daniël Gerrit Mulder, Eindhoven (NL)

(73) Assignee: Shapeways, Inc., New York, NY (US)

(*) Notice: Subject to any disclaimer, the term of this patent is extended or adjusted under 35 U.S.C. 154(b) by 0 days.

(21) Appl. No.: 15/787,461

(22) Filed: Oct. 18, 2017

(65) Prior Publication Data
US 2018/0104898 A1 Apr. 19, 2018

Related U.S. Application Data

(60) Provisional application No. 62/410,274, filed on Oct. 19, 2016.

(51) Int. Cl.
*B29C 64/386* (2017.01)
*B29C 64/153* (2017.01)
(Continued)

(52) U.S. Cl.
CPC .......... *B29C 64/386* (2017.08); *B29C 64/153* (2017.08); *B29C 64/20* (2017.08);
(Continued)

(58) Field of Classification Search
None
See application file for complete search history.

(56) References Cited

U.S. PATENT DOCUMENTS 4,239,434 A 12/1980 Gannon
4,509,123 A 4/1985 Vereen
(Continued)

OTHER PUBLICATIONS

International Search Report and Written Opinion dated Jan. 3, 2018 in connection with International Application No. PCT/US2017/057164.
(Continued)

*Primary Examiner* — Vikkram Bali
(74) *Attorney, Agent, or Firm* — Wolf, Greenfield & Sacks, P.C.

(57) ABSTRACT

According to some aspects, a system for identifying a printed object is provided. The system may include an imaging device configured to image a three-dimensional (3D) printed object and a processor coupled to the imaging device. The processor may be configured to receive information generated as a result of imaging the 3D printed object with the imaging device, identify a set of features for the 3D printed object using the received information, compare the set of features with multiple reference sets of features, each of the multiple reference sets of features being associated with a respective 3D object in a plurality of 3D objects, and
(Continued)

identify, based at least in part on results of the comparison, a 3D object from the plurality of 3D objects that matches the 3D printed object.

19 Claims, 12 Drawing Sheets

(51) Int. Cl.
*B29C 64/20* (2017.01)
*G01B 11/24* (2006.01)
*B33Y 10/00* (2015.01)
*B33Y 30/00* (2015.01)
*B33Y 50/02* (2015.01)
*B29C 64/171* (2017.01)

(52) U.S. Cl.
CPC ............ *G01B 11/24* (2013.01); *B29C 64/171* (2017.08); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 5,026,287 A | 6/1991 | Yamada | |
| 5,410,109 A | 4/1995 | Tarter et al. | |
| 5,518,122 A | 5/1996 | Tilles et al. | |
| 5,594,652 A | 1/1997 | Penn et al. | |
| 5,644,687 A | 7/1997 | Agonafer et al. | |
| 5,831,859 A | 11/1998 | Medeiros et al. | |
| 6,598,791 B2 | 7/2003 | Bellis et al. | |
| 6,655,421 B2 | 12/2003 | Kohashi et al. | |
| 6,907,307 B2 | 6/2005 | Chen et al. | |
| 6,956,465 B2 | 10/2005 | Meyer et al. | |
| 7,085,677 B1 | 8/2006 | Champlin et al. | |
| 7,311,250 B1 | 12/2007 | Herwig | |
| 7,320,205 B2 | 1/2008 | Cooper et al. | |
| 7,380,213 B2 | 5/2008 | Pokorny et al. | |
| 7,403,833 B2 | 7/2008 | Heide et al. | |
| 7,411,500 B2 | 8/2008 | Hamerly et al. | |
| 7,416,119 B1 | 8/2008 | Inderrieden | |
| 7,516,898 B2 | 4/2009 | Knowles et al. | |
| 8,001,677 B2 | 8/2011 | Dixon et al. | |
| 9,245,061 B2* | 1/2016 | Schouwenburg | G06F 17/50 |
| 9,662,839 B2 | 5/2017 | Napadensky | |
| 9,821,519 B2 | 11/2017 | Schouwenburg | |
| 2002/0090132 A1 | 7/2002 | Boncyk et al. | |
| 2003/0109949 A1 | 6/2003 | Ikeda et al. | |
| 2003/0133975 A1 | 7/2003 | Yoo et al. | |
| 2005/0045370 A1 | 3/2005 | Katayama | |
| 2005/0068317 A1* | 3/2005 | Amakai | G06T 7/001 345/419 |
| 2006/0038007 A1 | 2/2006 | Dickover et al. | |
| 2006/0043174 A1 | 3/2006 | Banaver et al. | |
| 2006/0106742 A1 | 5/2006 | Bochicchio et al. | |
| 2006/0111807 A1 | 5/2006 | Gothait et al. | |
| 2006/0188143 A1* | 8/2006 | Strassenburg-Kleciak | G06T 17/10 382/154 |
| 2007/0005379 A1 | 1/2007 | Juan-Castellanos et al. | |
| 2008/0147344 A1 | 6/2008 | Kwok et al. | |
| 2008/0211633 A1 | 9/2008 | Oh et al. | |
| 2009/0125406 A1 | 5/2009 | Lewis et al. | |
| 2010/0147049 A1 | 6/2010 | Haussmann et al. | |
| 2010/0150458 A1 | 6/2010 | Angell et al. | |
| 2010/0327001 A1 | 12/2010 | Godlewski | |
| 2010/0332005 A1 | 12/2010 | Lemelin et al. | |
| 2011/0087350 A1 | 4/2011 | Fogel et al. | |
| 2012/0095738 A1 | 4/2012 | Saito et al. | |
| 2013/0310965 A1 | 11/2013 | Schouwenburg | |
| 2014/0172357 A1* | 6/2014 | Heinonen | G01C 21/005 702/150 |
| 2014/0363048 A1 | 12/2014 | Vrcelj et al. | |
| 2015/0328839 A1 | 11/2015 | Willis et al. | |
| 2016/0098824 A1* | 4/2016 | Fry | B33Y 50/02 700/108 |
| 2016/0214324 A1 | 7/2016 | Schouwenburg | |
| 2017/0190121 A1 | 7/2017 | Aggarwal et al. | |
| 2017/0220887 A1* | 8/2017 | Fathi | G06K 9/00201 |

OTHER PUBLICATIONS

Extended European Search Report dated Jun. 2, 2020 in connection with European Application No. 17862820.2.

\* cited by examiner

Trays Overviews — 202

| Name | Date ▲ | Items | Actions |
|---|---|---|---|
| 2015010901 | 2015-01-09 | 76 | Visual Identification ♥ |
| 2015010802 | 2015-01-08 | 120 | Visual & Weight Identification ♥ |
| 2015010801 | 2015-01-08 | 116 | Visual Identification ♥ |
| 2015010701 | 2015-01-07 | 84 | Weight Identification ♥ |

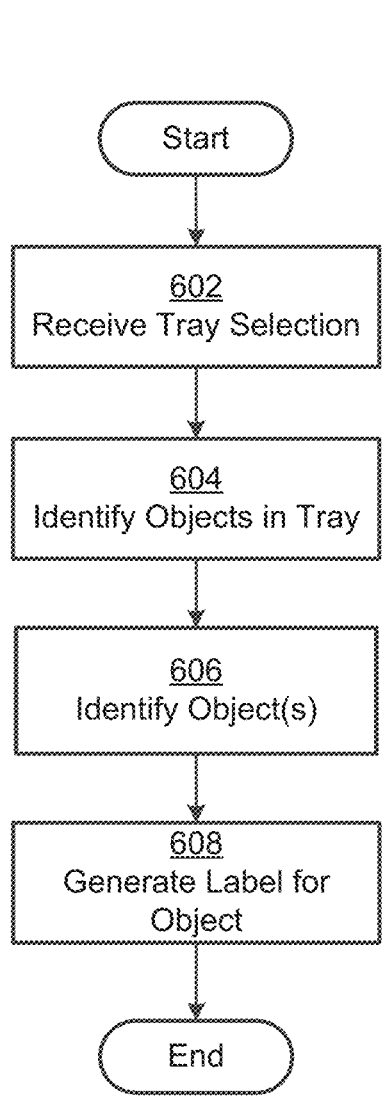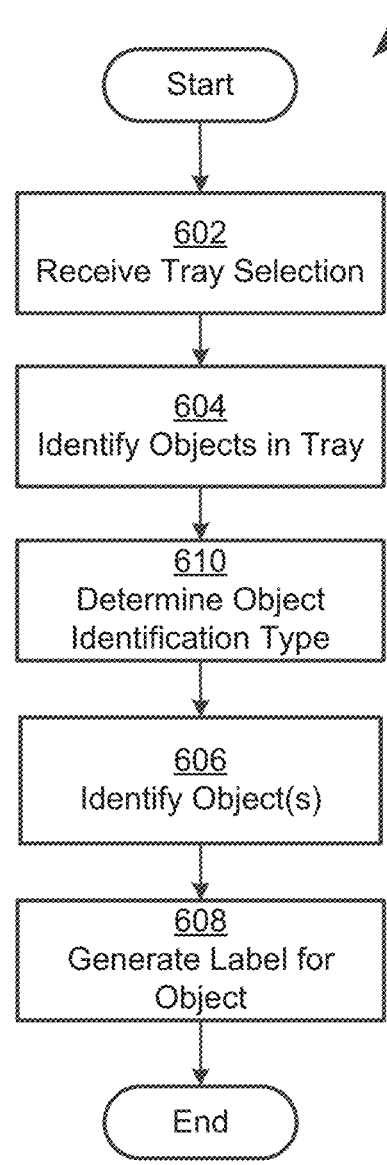
FIG. 6A
FIG. 6B

SYSTEMS AND METHODS FOR IDENTIFYING THREE-DIMENSIONAL PRINTED OBJECTS

CROSS-REFERENCE TO RELATED APPLICATIONS

This application claims the benefit under 35 U.S.C. § 119(e) of U.S. Provisional Application Ser. No. 62/410,274, entitled "SYSTEMS AND METHODS FOR IDENTIFYING THREE-DIMENSIONAL PRINTED OBJECTS" filed on Oct. 19, 2016, which is herein incorporated by reference in its entirety.

FIELD

Aspects of the technology described herein relate to three-dimensional (3D) printing and processing of 3D printed objects. Some aspects relate to techniques for identifying 3D printed objects from among those printed.

BACKGROUND

Some three-dimensional printing techniques print an object by successively forming a series of material layers in accordance with a 3D model of the object to be printed. Some companies, such as SHAPEWAYS, provide on-demand 3D printing services where customers may upload custom 3D models, select materials, and order printed objects to be built from selected materials. These on-demand printing services allow customers to convert a custom 3D model into any number of printed objects without the expense of purchasing and operating a 3D printer.

SUMMARY

According to at least one aspect, a system is provided. The system includes an imaging device configured to image a three-dimensional (3D) printed object and a processor coupled to the imaging device. The processor is configured to receive information generated as a result of imaging the 3D printed object with the imaging device, identify a set of features for the 3D printed object using the received information, compare the set of features with multiple reference sets of features, each of the multiple reference sets of features being associated with a respective 3D object in a plurality of 3D objects, and identify, based at least in part on results of the comparison, a 3D object from the plurality of 3D objects that matches the 3D printed object.

According to at least one aspect, a method is provided. The method includes imaging a three-dimensional (3D) printed object using an imaging device, identifying a set of features from information generated as a result of the imaging, comparing the set of features with multiple reference sets of features, each of the multiple reference sets of features being associated with a respective 3D object in a plurality of 3D objects, and identifying, based at least in part on results of the comparison, a 3D object from the plurality of 3D objects that matches the 3D printed object.

According to at least one aspect, at least one non-transitory computer-readable storage medium storing processor-executable instructions is provided. The processor-executable instructions, when executed by at least one processor, cause the at least one processor to image a three-dimensional (3D) printed object using an imaging device, identify a set of features from information generated as a result of the imaging, compare the set of features with multiple reference sets of features, each of the multiple reference sets of features being associated with a respective 3D object in a plurality of 3D objects, and identify, based at least in part on results of the comparison, a 3D object from the plurality of 3D objects that matches the 3D printed object.

BRIEF DESCRIPTION OF THE DRAWINGS

Various aspects and embodiments will be described with reference to the following figures. It should be appreciated that the figures are not necessarily drawn to scale. Items appearing in multiple figures are indicated by the same or a similar reference number in all the figures in which they appear.

FIG. 2 is a display showing an example user interface for an operator to select a particular tray to process, according to some embodiments of the technology described herein;

FIGS. 6A, 6B, and 6C are flowcharts showing respective example processes for sorting printed objects in a tray, according to some embodiments of the technology described herein;

DETAILED DESCRIPTION

Figure 1A:
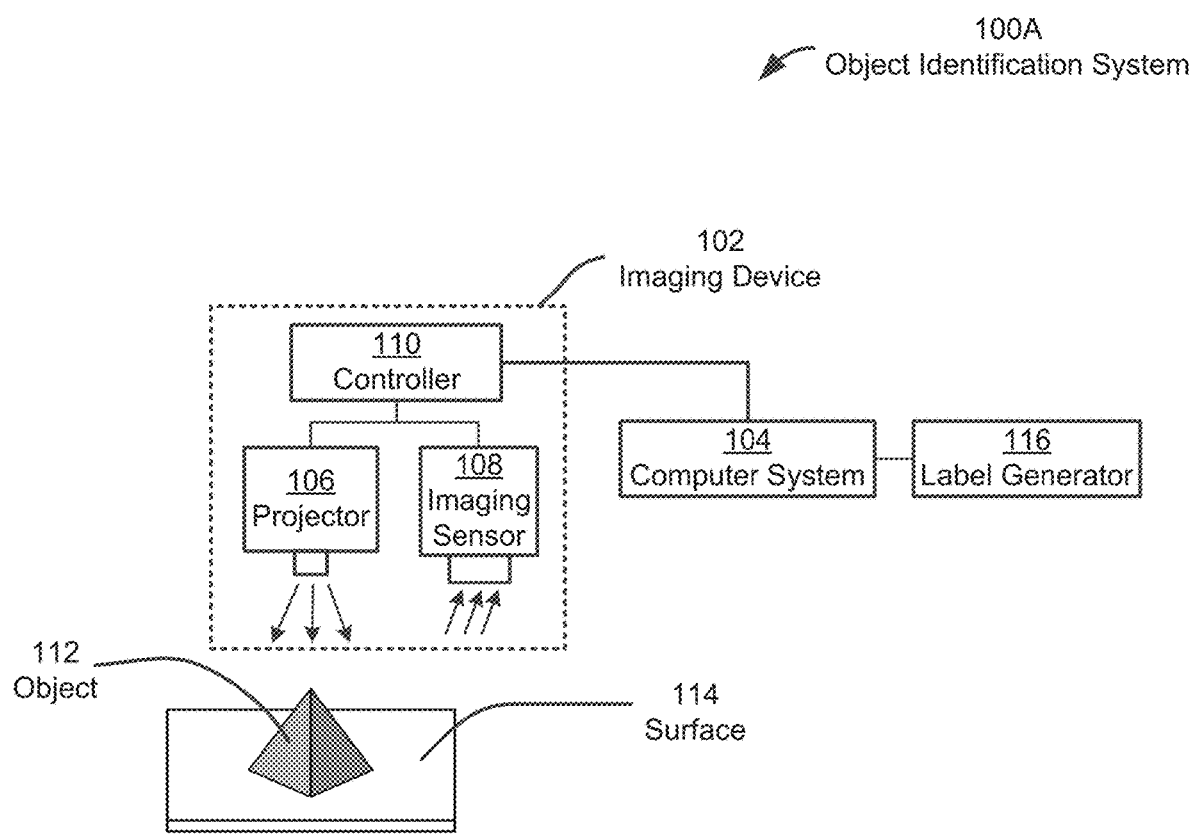
FIGS. 1A and 1B are each a diagram showing an example object identification system, according to some embodiments of the technology described herein.

Aspects of the present disclosure are directed to improved on-demand printing processes. In an on-demand 3D printing process, a service provider may receive a custom 3D model from a customer and schedule the custom 3D model to be built by a 3D printer, such as a selective laser sintering (SLS) 3D printer, in a tray along with one or more other 3D models. For example, the tray may be used to print 50-800 objects including the object for the customer and other objects for different customers. After the objects have been printed in the tray, the printed objects may be sorted by an operator. Conventionally, the operator manually sorts the printed objects in the tray by comparing each printed object with images on a contact sheet illustrating all of the printed objects in the tray. Once the objects are each associated with a customer order, the objects may be packaged and shipped to customers.

The inventors have appreciated that manually sorting the printed objects in a tray is a time-consuming process that is subject to human error. The inventors have conceived and developed various systems and associated methods to identify printed objects quickly with minimal or no intervention by a human operator. In some embodiments, various computer vision techniques may be employed to identify the 3D printed object. For example, in some embodiments, the 3D printed object may be scanned by a 2.5D or 3D scanner to generate a model of the 3D printed object. Then the generated model of the printed object may be compared with a set of models (e.g., the models specifying the objects that were printed in the tray) to determine the identity of the printed object. Once the identity of the printed object has been determined, the systems disclosed herein may determine whether the printed object has missing features, is broken, or is otherwise defective. If the printed object is determined to be defective, the system may notify the operator and/or send an instruction to an external system to have another copy of the defective object printed. Otherwise, the system may generate a label for the printed object to identify uniquely the printed object in subsequent processing steps such as, for example, packaging and shipping.

Accordingly, some embodiments are directed to an object identification system for determining the identities of 3D printed objects. The system may include an imaging device configured to image a 3D printed object. The imaging device may be, for example, a 2.5D or 3D scanning device configured to generate information indicative of various features of the printed object. For example, the imaging device may generate information indicative of the shape of the printed object, such as a point cloud model of the printed object. The imaging device may provide the generated information to a processor that is configured to determine an identity of the object based on the generated information. The processor may be housed in a computer system that is communicatively coupled to the imaging device.

It should be appreciated that the processor may determine the identity of the imaged object based on information from the imaging device in any suitable way. In some embodiments, the processor may be configured to receive information generated as a result of imaging the 3D printed object with the imaging device and identify a set of features for the 3D printed object using the received information. The set of features may be descriptive of, for example, the shape and/or color of the printed object and be subsequently used to compare the printed object with a plurality of objects to identify the printed object. The set of features may include shape characteristics of the object such as, for example, the distances between a center point of the printed object and various points on the surface of the printed object. The processor may be further configured to compare the set of features with multiple reference sets of features that are each associated with a respective object in a plurality of objects. For example, the processor may be configured to generate a score for each object of the plurality of objects as a result of the comparison that indicates how closely each object matches the printed object. The processor may use scores generated for each of the objects to identify an object from the plurality of objects that matches the printed object.

In some embodiments, the processor may select a subset of the plurality of objects that most closely match the printed object. The subset of objects may include the objects with a top number (e.g., two, three, five, etc.) highest scores and/or objects that have scores above a threshold. The printed object may be, in turn, identified from the subset of objects by the processor and/or by the processor in conjunction with an operator. For example, the processor may identify the printed object by automatically selecting the object with the highest score. As another example, the processor may provide the subset of objects to an operator via a user interface (e.g., by displaying images of the objects in the subset to the operator via a display) and allow the operator to select which object is the printed object from the subset of objects (e.g., by clicking on the printed object in the display).

In some embodiments, the object identification system may perform one or more pre-filtering processes to identify candidate objects that likely match the printed object being identified. In these embodiments, objects that are unlikely to match the printed object being identified may be removed prior to performing the feature comparison to identify the printed object. Thereby, the computational complexity of performing the feature comparison may be reduced. For example, the object identification system may obtain one or more dimensions of the printed object based on the information received from the imaging device and generate a bounding box that fits around the printed object. In this example, the object identification system may remove objects that are larger than the generated bounding box from a list of candidate objects. The object identification system may then perform a comparison between the features of the printed object and features associated with the remaining candidate objects to determine the identity of the printed object.

In some embodiments, the processor may perform various quality assurance functions to identify defective printed objects. In these embodiments, the processor may notify the operator and/or send an instruction to an external system to have another copy of the identified object printed in response to determining that the printed object is defective. For example, the processor may compare the printed object with a model of the identified object to determine if a portion of the printed object is missing, damaged, and/or deformed. In this example, the processor may notify the operator of the damaged object and/or automatically send an instruction to an external system to have another copy of the object printed on a 3D printer.

In some embodiments, an object identification system may further include a label generation device that is communicatively coupled to the processor. In these embodiments, the processor may be configured to communicate with the label generation device to create a label for the printed object once the printed object has been identified. For example, the label generation device may include a printer and the processor may instruct the printer to print a label for the printed object. The printed label may be, for example, applied to the printed object and/or a bag containing the printed object for subsequent identification of the printed object during packing and/or shipping processes. In another example, the printed object labels may include smart tags such as near field communication (NFC) tags and radio frequency identification (RFID) tags. In this example, the label generation device may include a smart tag writer configured to write a code to the smart tag that may be subsequently read by a smart tag reader during, for example, packing and/or shipping processes. The smart tags may be applied to the printed object and/or a packaging containing the printed object.

It should be appreciated that the embodiments described herein may be implemented in any of numerous ways. Examples of specific implementations are provided below for illustrative purposes only. It should be appreciated that these embodiments and the features/capabilities provided may be used individually, all together, or in any combination of two or more, as aspects of the technology described herein are not limited in this respect.

FIG. 1A shows an example object identification system 100A for identifying 3D printed objects. As shown in FIG. 1A, the object identification system 100A includes a computer system 104 communicatively coupled to an imaging device 102 and a label generator 116. The imaging device 102 may be a scanner (e.g., a 2.5D scanner or a 3D scanner) configured to image object 112 and generate information indicative of the imaged object 112 that may be employed by the computer system 104 to identify the object 112. After object 112 is identified, the computer system 104 may create a label for the object 112 via the label generator 116.

In some embodiments, an operator may interact with the object identification system 100A to determine an identity of the object 112 and create a label for the object 112. The operator may remove the object 112 from a tray of a 3D printer and place the object 112 on the surface 114. The operator may then interact with the computer system 104 to direct the object identification system 100A to determine the identity of the object 112 on the surface 114. The object identification system 100A may create a label for the object 112 via the label generator 116 once the identity of the object 112 has been determined. The operator may place the label on the object 112 and/or place the object 112 in a bag and place the label on the bag containing the object 112.

It should be appreciated that the object identification system 100A may operate without any intervention by an operator. In some embodiments, the printed objects may be moved via a conveyor belt or other suitable mechanism from a 3D printer to the surface 114. The object identification system 100A may automatically identify that the object 112 is within the field of view of the imaging device 102 and begin an object identification process. For example, the computer system 104 may receive a stream of one or more images from the imaging device 102 and analyze the received images to determine when the object 112 is within the field of view of the imaging device 102. The object identification system 100A may automatically generate a label for the object 112 via the label generator 116 once the object 112 has been identified. For example, the label generator 116 may be a printer that prints a label directly onto a bag and/or prints a label that is otherwise applied to a bag containing the object 112 by a suitable system. In another example, the label generator 112 may be a smart tag writer and the smart tag writer may program a smart tag, such as an NFC tag or an RFID tag, attached to the identified object and/or a packaging containing the object 112 with information to identify the object 112, such as a unique identifier.

In some embodiments, the imaging device 102 is configured to generate information indicate of the object 112 that may subsequently be employed by the computer system 104 to identify the object 112. As shown in FIG. 1A, the imaging device 102 includes a controller 110 coupled to a projector 106 and an imaging sensor 108. The controller 110 may be a microcontroller or other processing device that controls the operation of the imaging device 102. For example, the controller 110 may coordinate operation of the projector 106 and/or the imaging sensor 108 to capture images of the object 112. In some embodiments, at least some (e.g., all) of the functionality performed by controller 110 may be performed by the computer system 104. For example, the computer system 104 may perform all of the functionality of the controller 110 and the computer system 104 may be directly coupled to the projector 106 and imaging sensor 108. In such embodiments, the imaging device 102 may not include the controller 110.

It should be appreciated that the object identification system 100A may be configured to image multiple (e.g., two, three, four, five, etc.) objects 112 and ascertain the identity of each object 112. For example, the imaging device 102 may capture images containing multiple objects 112 and the computer system 104 may automatically determine that multiple objects 112 were present in the captured images and ascertain the identity of each object 112 in the captured images. In some embodiments, the objects 112 may be positioned at predetermined locations on the surface 114 that may be leveraged by the imaging device 102 and/or the computer system 104 to segment the captured images into regions that only contain one object 112. For example, four objects 112 may be placed in four different quadrants of the surface 114 that are all within the field of view of the imaging device 102. Thereby, the imaging sensor 108 may image all four of the objects 112 simultaneously (e.g., by capturing a single image of the four objects or by capturing different images of the four objects). In this example, the controller 110 and/or the computer system 104 may then segment each image captured by the imaging sensor 108 into four portions corresponding to the four quadrants on the surface 114 (and thereby the four objects 112). In other embodiments, the position of the objects 112 on the surface 114 may be unknown to the object identification system 100A and the object identification system 100A may identify and/or label the location of each object 112 in the captured images for subsequent processing. For example, seven objects 112 may be positioned on the surface 114 that are all within the field of view of the imaging device 102. In this example, the controller 110 and/or the computer system 104 may identify a plurality of regions in the captured image that each include a single object 112 using various computer vision techniques, such as image segmentation techniques.

In some embodiments, the imaging device 102 may be a 2.5D scanner that is configured to generate a model (e.g., a point cloud model) of a portion of the external surface of the object 112. The model may include portions of the external surface of the object 112 that are in the field of view of the imaging device 102. The imaging device 102 may generate the model of the object 112 by projecting a sequence of light patterns on the object 112 via the projector 106 and simultaneously capturing images of the object 112 via the imaging sensor 108. The images captured by the imaging sensor 108 include the reflection of the patterned light emitted by the projector 106 off of the object 112. The reflections may be analyzed to determine a model of the contours of the object 112 that are in the field of view of the imaging device 102. The model may be generated by the controller 110 and/or by the computer system 104. For example, the controller 110 may provide the images captured by the imaging sensor 108 to the computer system 104 or generate a model of the object 112 and provide the generated model to the computer system 104.

It should be appreciated that the imaging device 102 may be configured as a complete 3D scanner. For example, the imaging device 102 may include multiple imaging sensors 108 and/or multiple projectors 106 to increase the portion of the object 112 that is in the field of view of the imaging device 102 and, thereby, form a more complete (or complete) model of the object 112. In addition (or alternatively), the surface 114 may rotate the object 112 to bring different sections of the object 112 into the field of the view of the imaging device 102.

In some embodiments, the computer system 104 may receive information from the imaging device 102 descriptive of the object 112 and identify the object 112 based on the received information. In some embodiments, the computer system 104 may generate a model (e.g., a point cloud model) of the object 112 based on the information received from the imaging device 102 (or receive a model from the scanner 102) and identify various features of the object 112 based on the model. These features may include, for example, various dimensions of the model and/or distances between various points in the model. The identified features may be compared with sets of reference features each associated with a respective object of a plurality of objects that were, for example, printed in the same tray as the object 112. The computer system 104 may generate a score indicative of how closely each object of the plurality of objects matches the object 112. The computer system 104 may, for example, identify the object with the highest score as the object that matches the object 112. In other examples, the computer system 104 may identify the object 112 with the assistance of an operator. For example, the computer system may display a subset of the plurality of objects with the highest scores to an operator and allow an operator to identify the object 112 from the subset of the plurality of objects. Once the computer system 104 has identified the object 112, the computer system may interact with the label generator 116 to generate a label for the object 112.

In some embodiments, the object identification system 100A may gather additional information about the object 112 to assist in determining the identity of the object 112. For example, the object identification system may also gather information regarding the weight of the object 112 and compare the weight of the object 112 with a set of weights that would be obtained if other models were printed with the same material. Such an example object identification system is shown in FIG. 1B by object identification system 100B.

Figure 1B:
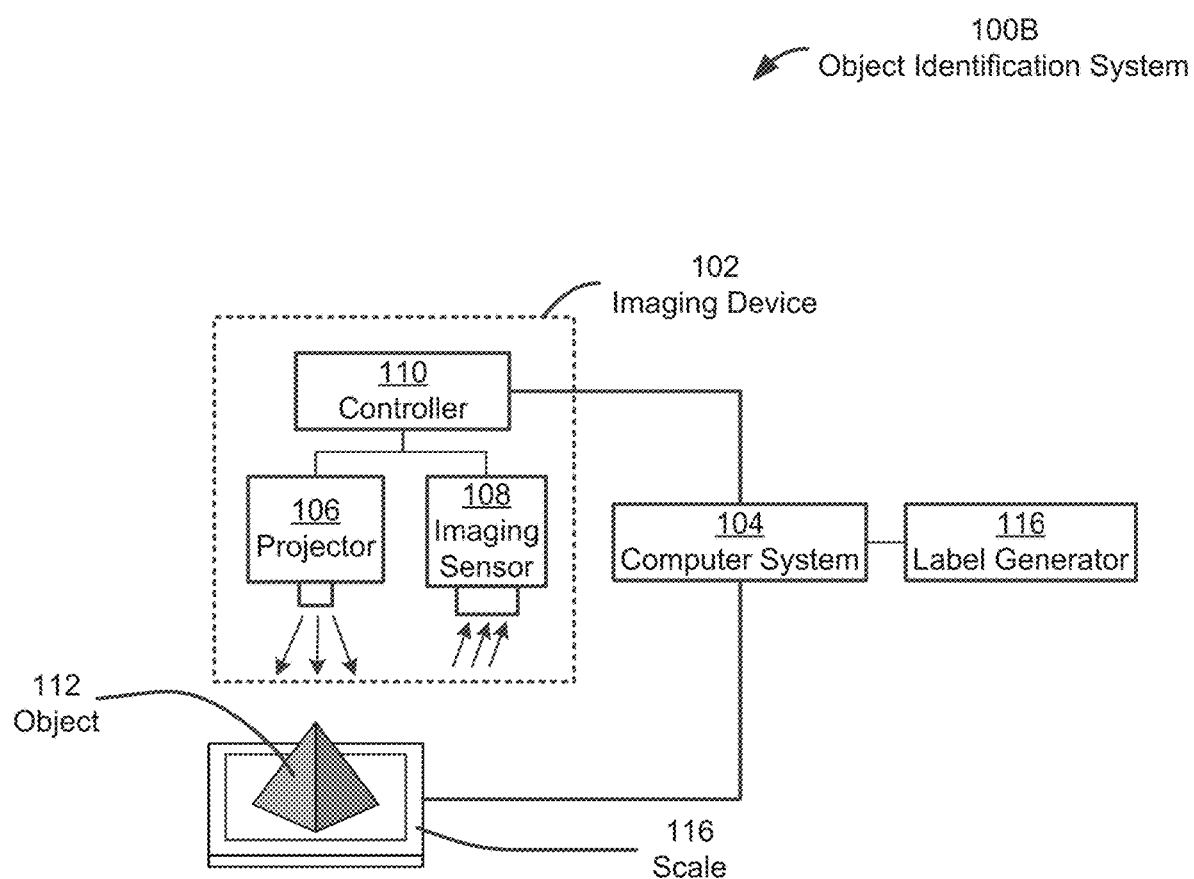

As shown in FIG. 1B, the object identification system 100B adds a scale 116 coupled to the computer system 104 relative to the object identification 100A shown in FIG. 1A. The scale 116 generates information indicative of the weight of the object 112 and provides the information to the computer system 104. The computer system 104 may use the weight to, for example, supplement the information received from the imaging device 102 to determine an identity of the object. For example, the computer system 104 may be configured to identify the object 112 based on information received from the imaging device 102 and confirm the identity of the object 112 based on the weight received from the scale 116.

In some embodiments, the computer system 104 described above in FIGS. 1A and 1B may include input and/or output devices such as a display, a keyboard, and a mouse to allow an operator to interact with the computer system 104. In these embodiments, the computer system 104 may receive information from the operator regarding the object 112. For example, the computer system 104 may receive an indication of which tray the object 112 originated. The computer system 104 may communicate with various systems to identify the objects printed in the tray identified by the operator and, thereby, reduce the total number of possible identities of the object 112. Further, the computer system 104 may receive an indication of a preferred object identification technique to employ in identifying the object 112 from the operator. For example, the computer system 104 may receive an indication from the operator to identify the object based solely on information received the imaging device 102. Accordingly, the computer system 104 may display various user interface screens to facilitate an operator to interact with the computer system 104. Example user interfaces that may be presented to a user of the computer system 104 are described below with reference to FIGS. 2-4.

FIG. 2 illustrates an example tray selection user interface screen 200 suitable for an operator to select the tray that the printed object 112 originated. The user interface screen 200 may be displayed to an operator via, for example, the computer system 104. As shown, the tray selection screen 200 may include a table 202 listing printed trays and associated information about each tray. The table 202 includes a name column 204 showing the name of each tray, a date column 206 showing the date each tray was printed, and a column 208 showing the number of objects printed in each tray. As shown, the listing of trays in column 122 may be sorted by the dates in column 206. The trays in the table 202 may be ordered based on other columns in the table 202. For example, the table 202 may be sorted by the number of items in each tray shown in column 208.

In the illustrated embodiment, the table 202 includes an actions column 210 showing the available actions for each tray including, for example, a list of available object identification processes that may be performed. The actions column 210 may show the available actions for each tray via a drop-down menu. For example, the available actions may include: visual identification, weight identification, and visual & weight identification. The visual identification action may cause the computer system 104 to interact with the imaging device 102 to scan the object 112 and identify the object 112 based on the information received from the imaging device 102. The weight identification action may cause the computer system 104 to interact with the scale 116 to weigh the object 112 and identify the object 112 based on the information received from the scale 116. The visual and weight identification action may cause the workstation to interact with both the scale 116 and the imaging device 102 to both scan and weigh the object 112 and identify the 3D printed object based on the information received from the imaging device 102 and the scale 116.

In some embodiments, the default action shown in the actions column 210 for a particular tray may be the recommended action to perform for the particular tray. In these embodiments, the computer system 104 may analyze the objects in each tray to identify which action is most likely to yield an accurate result. For example, the computer system 104 may determine that the theoretical weights of the objects in the tray all fall within a narrow range of weights, such as between 105 grams and 110 grams. In this example, the computer system 104 may identify the visual identification action as the default action to display to the operator because the weight-based identification is less likely to yield accurate results given the small weight variance of the objects in the tray. It should be appreciated that the user interface may allow an operator to select an object identification type via a drop-down menu that is different from the default identification type and, thereby, override the recommendation.

Figure 3:
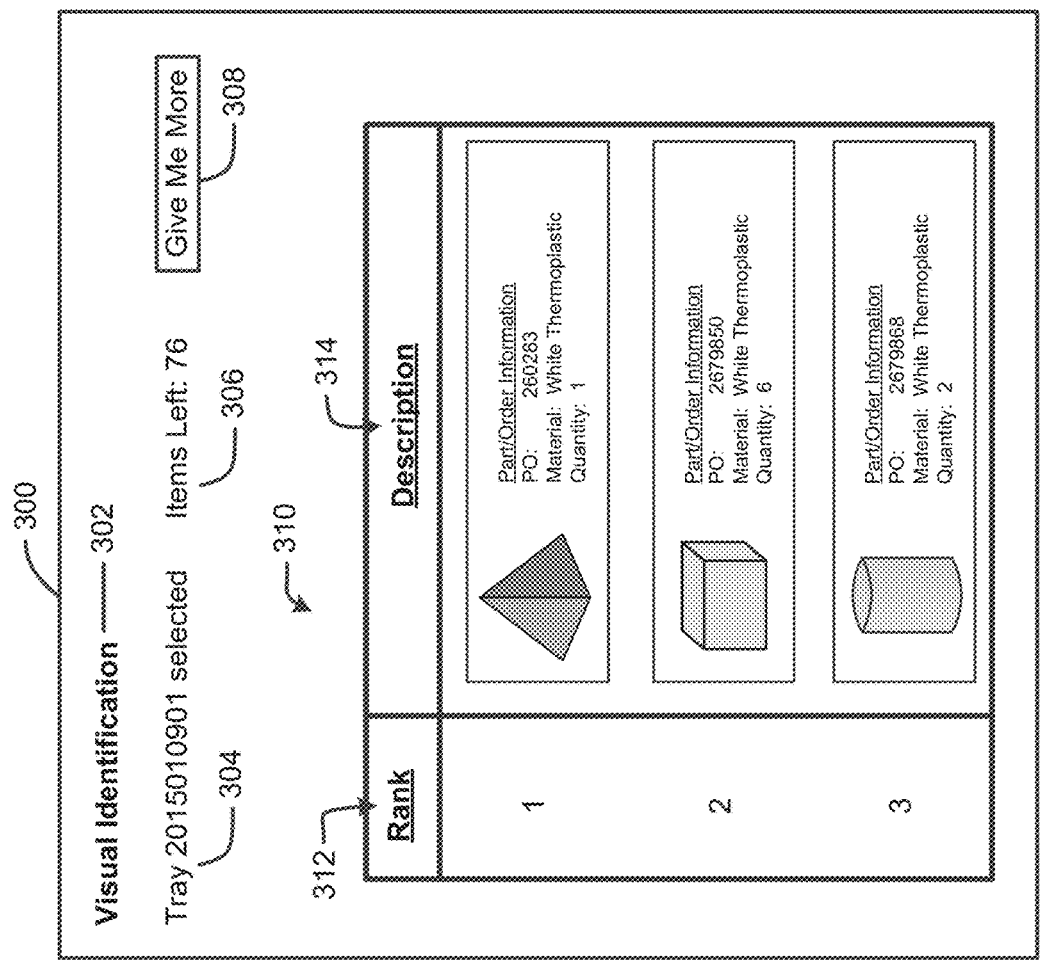
FIG. 3 is a display showing an example user interface to show the results of the object identification process, according to some embodiments of the technology described herein.
Figure 4:
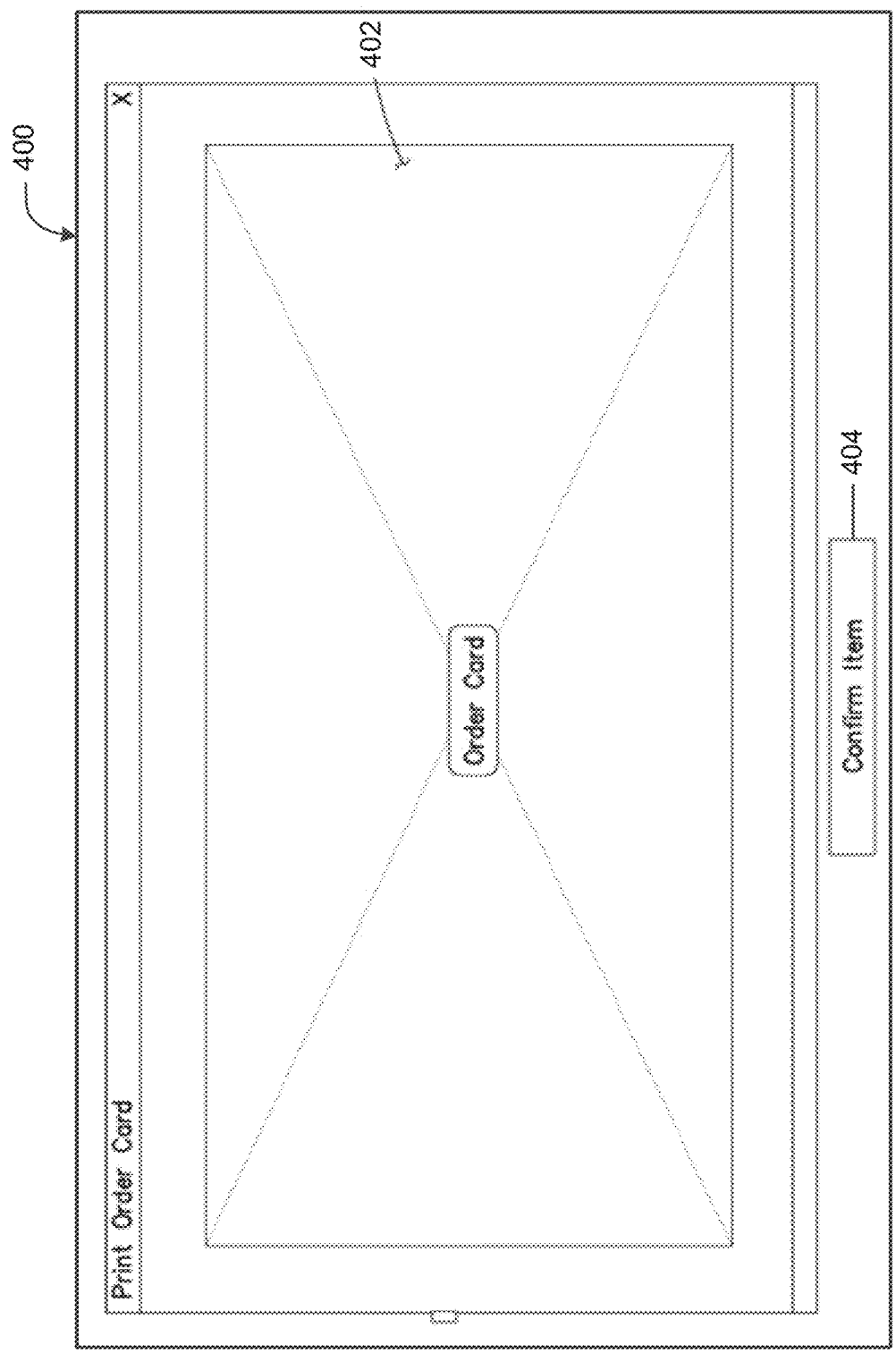
FIG. 4 is a display showing an example user interface for an operator to print a label for the identified object, according to some embodiments of the technology described herein.

As discussed above, an action may be selected via the available actions column 210. In some embodiments, the selection of an available action may trigger the computer system 104 to start an object identification process as described in detail further below with reference to FIGS. 7-10. The results of the object identification process performed may be displayed to an operator via a user interface on the computer system 104. Such an example user interface screen is shown in FIG. 3 by user interface screen 300.

As shown, the user interface screen 300 includes a label 302 indicating the particular type of object identification process performed, a label 304 indicating the selected tray, and a label 306 indicating the number of items left in the selected tray to be identified. The results of the object identification process performed are shown as rows in the table 310. The table 310 includes a rank column 312 indicating the rank of each candidate matching object, which rank may be indicative of a confidence of the match. For example, the matching object ranked first may have the highest confidence level while the matching object ranked third may have a lower confidence level. The table 310 also includes a description column 314 providing a description of each matching object. As shown, the description may include an image of the matching object in addition to a purchase order associated with the object, a material that the object is constructed from, and a quantity of the matching object in the selected tray. The user interface 300 further includes a button 308 to trigger the user interface 300 to display additional results. For example, an operator may want to view the match that is ranked fourth. In this example, the operator may activate the button 308 to trigger the user interface 300 to extend the table 310 to display the next set of matching objects (e.g., matching objects ranked fourth through sixth).

In some embodiments, the user interface 300 may allow an operator to select one of the candidate matches in the table 310 to identify the object 112. For example, the operator may look at the object 112 and select an object from the table 310 that matches the object 112, such as the first matching object from the table 310. In response to an object being selected from the table 310, the computer system 104 may display a new user interface to enable the operator to print a label for the identified object. An example of such a user interface is the user interface 400 shown in FIG. 4. As shown, the user interface 400 includes an area 402 to display the label to be generated for the object 112 and a button 404 to confirm that the label is correct. The computer system 104 may generate the label via the label generator 116 in response to the button 404 being activated and remove the identified object from the objects remaining in the selected tray. For example, the computer system 104 may decrement the number of objects remaining in Tray 2015010901 from 75 objects to 74 objects.

Figure 5:
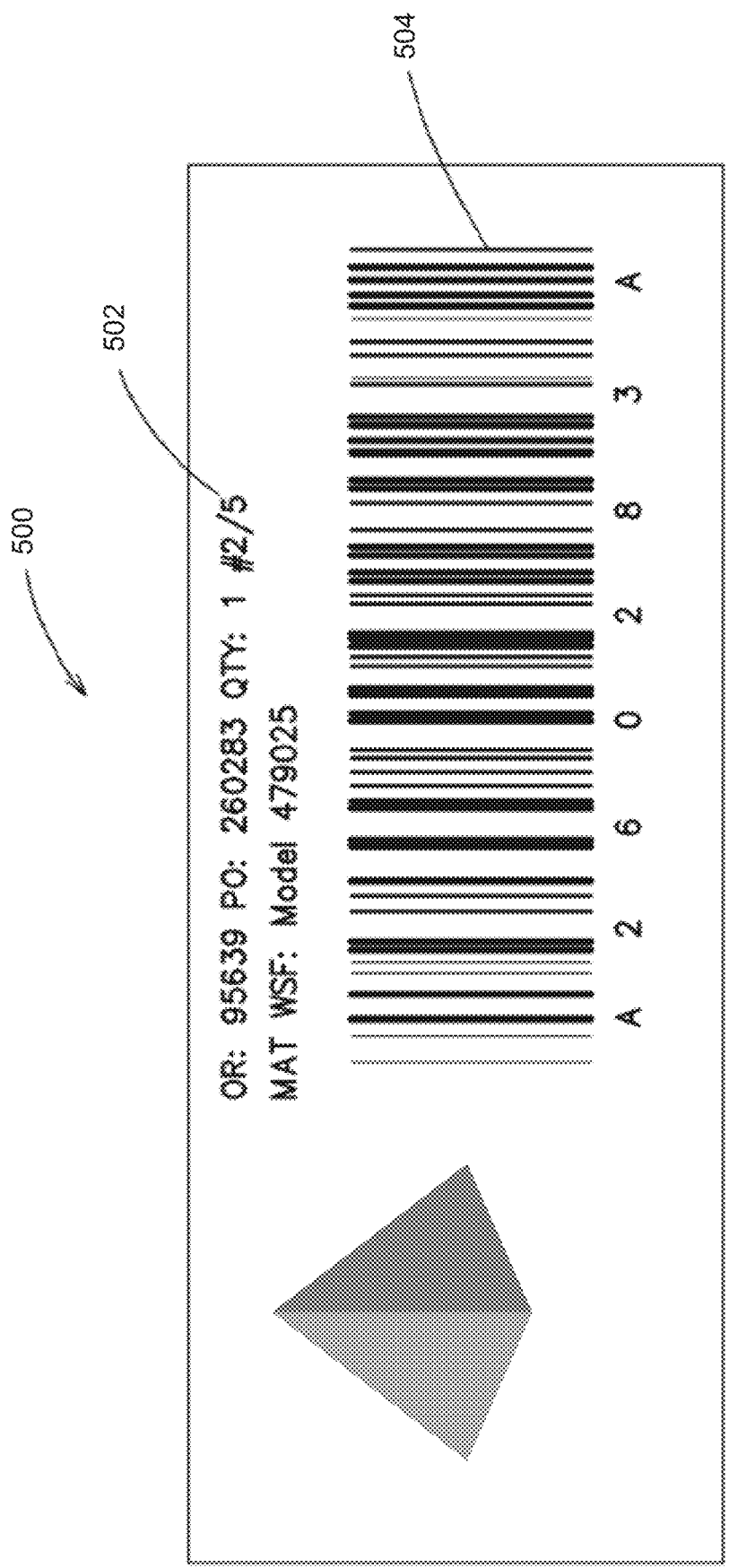
FIG. 5 is an example label for an identified object, according to some embodiments of the technology described herein.

FIG. 5 illustrates an example label 500 for an identified object. The label 500 includes a barcode 504 that corresponds to, for example, the model employed to print the object and/or a purchase order that includes the object. The label 500 also includes a description 502 including information identifying the object. The description 502 may include, for example, a customer order number, production order information, a material code corresponding to the material used to print the object, and a model number corresponding to the object.

Figure 6C:
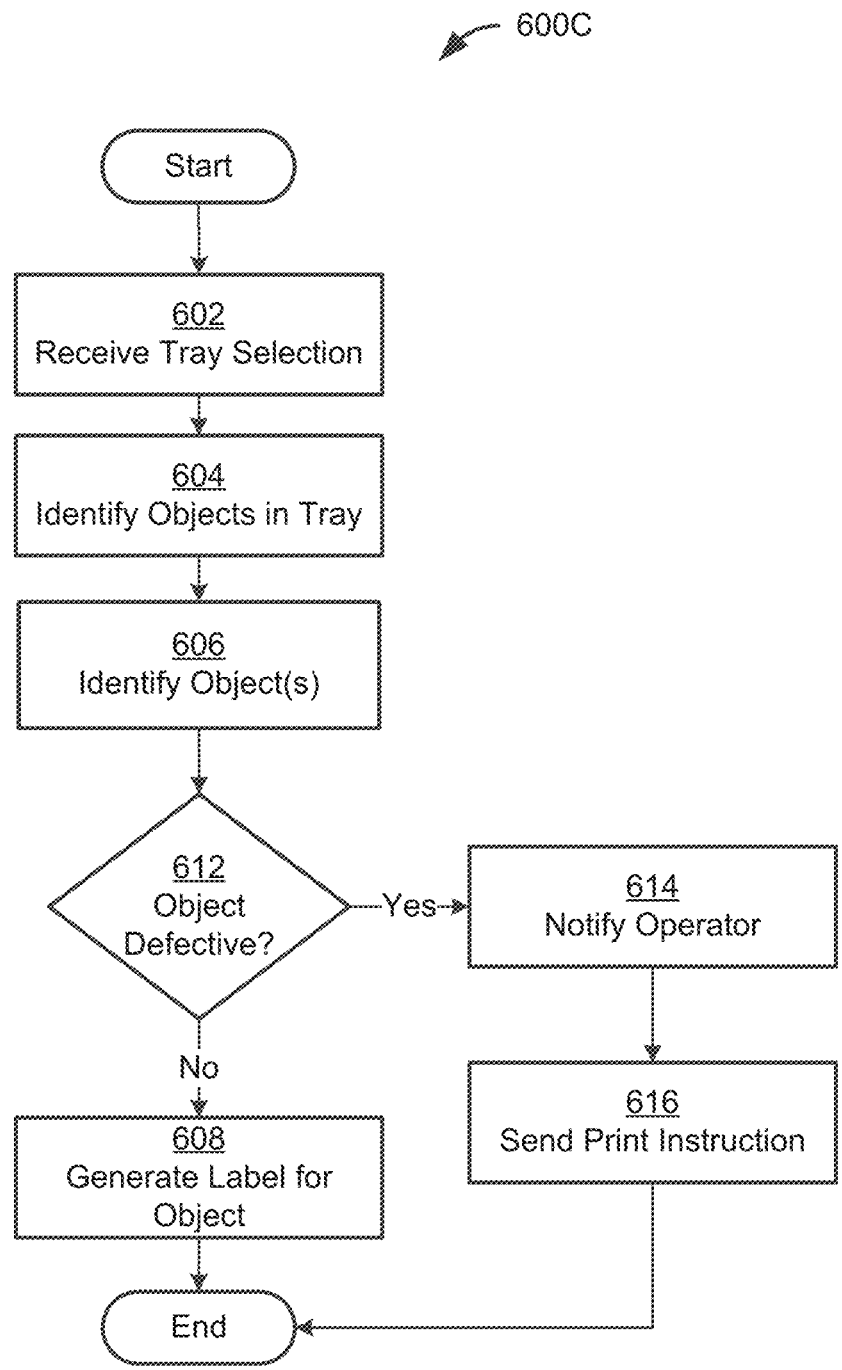

As discussed above, the object identification systems described herein may expedite the process of sorting objects from a printed tray by, for example, simplifying the object identification process. An example of such a tray sorting process that may be performed by an object identification system, such as object identification systems 100A or 100B described above with reference to FIGS. 1A and 1B, is illustrated by process 600A in FIG. 6A.

In act 602, the object identification system may receive a tray selection indicating the tray from which the object being identified originated. The object identification system may receive the tray selection from any suitable source. For example, the object identification system may receive the tray selection from an operator via, for example, user interface 200 on computer system 104. In another example, the object identification system may receive the tray selection from a 3D printer that printed the tray and is communicatively coupled to the object identification system. In other examples, the object identification system may receive the tray selection from a server or other computer system.

In act 604, the object identification system may identify the objects that were scheduled to be printed in the tray selected in act 602 that have not already been identified. For example, the object identification system may be communicatively coupled to the 3D printer that printed the tray and communicate with the 3D printer to identify the objects that were scheduled to be printed in the tray. In other embodiments, the object identification system may identify the objects scheduled for printing in the selected tray by communicating with a server or other system to obtain a list of the objects scheduled to be printed in the selected tray. The initial list of objects including all of the objects scheduled to be printed in the tray may be modified to account for objects that have already been identified. For example, the objects in the tray may initially include a sphere and a cube. In this example, the object identification system may remove the sphere from the list of objects in the tray when the sphere has been identified and a label has been generated. Thereby, the only object remaining in the tray to be processed is the cube.

In act 606, the object identification system may determine an identity of one or more printed objects from the selected tray. For example, the printed object(s) being identified may be placed on the surface 114 and scanned by the imaging device 102. In this example, the object identification system may match information indicative of the object 112 with each of the objects that were identified in act 604 that were printed in the same tray as object 112. An example of such an object identification process is described in more detail below with reference to FIGS. 7 and 8. It should be appreciated that information separate from the information received from the imaging device 102 may be employed to identify the object. For example, the weight of the object 112 may be determined and used to determine (or confirm) the identity of the object as discussed in more detail below with reference to FIGS. 9 and 10.

In act 608, the object identification system may generate a label for the identified object. In some embodiments, the object identification system may present a label to be printed to an operator via, for example, user interface 300 on computer system 104 to have the operator confirm that the label is correct. In these embodiments, object identification system may print the label once the operator has confirmed that the label is correct via the label generator 116. In other embodiments, the object identification system may leverage smart tags, such as NFC tags or RFID tags, to label the identified object. In these embodiments, the smart tag may be affixed to the identified object and/or packaging (e.g., a bag or a box) containing the identified object and the object identification system may program the smart tag with information to uniquely identify the object, such as a unique identifier. The information programmed into the smart tag may be subsequently read by, for example, a smart tag reader to allow an operator and/or another system to determine the identity of the object.

It should be appreciated that various alterations may be made to process 600A without departing from the scope of the present disclosure. In some embodiments, the object identification system may be capable of identifying the object using any suitable object identification technique (e.g., an image-based technique, a weight-based technique, or an image- and weight-based technique). In these embodiments, the system may determine (e.g., automatically or based on user input) the type of object identification technique to use for identifying 3D printed objects. One example of such a process is illustrated by process 600B in FIG. 6B. As shown, process 600B adds an act 610 of determining the object identification type relative to process 600A.

In act 610, the object identification system may determine the appropriate object identification process to perform in act 606. In some embodiments, the object identification process to be performed may be identified by an operator via, for example, user interface 200 on computer system 104. In other embodiments, the object identification system may identify, automatically without user input, the appropriate object identification process based on the identified objects in the tray selected in act 602. For example, the object identification system may determine a theoretical weight for each object in the tray and analyze the distribution of weights in the tray to assess whether weight-based object identification is suitable for the tray. If the distribution of theoretical weights is very tightly packed, it is unlikely that weight-based object identification is going to yield an accurate result. Thereby, the system may select a different method of object identification to perform, such as visual object identification. Conversely, weight-based object identification may be selected by the system in cases where the theoretical weights are distributed across a wide range. In situations where no particular object identification process may likely yield an accurate result, the system may employ a combination of object identification types. For example, the system may employ both visual object identification and weight-based object identification techniques to identify the object.

In some embodiments, the object identification system may be capable of performing various quality assurance functions such as identifying and/or processing defective objects. In these embodiments, the system may determine whether the identified object is damaged, misshapen, and/or broken and automatically notify an operator and/or send an instruction to an external system to have another copy of the identified object printed. One example of such a process is illustrated by process 600C in FIG. 6C. As shown, process 600C includes an act 612 of determining whether the object is defective, an act 614 of notifying the operator 614, and an act 616 of sending a print instruction 616.

In act 612, the object identification system may determine whether the identified object is defective (e.g., damaged, misshapen, broken, off-color, or any combination of the foregoing defects). In some embodiments, the object identification system may compare one or more characteristics of the printed object (e.g., color, shape, size, location of certain features) with a model of the identified object to identify one or more faults. In these embodiments, the object identification system may proceed to act 614 of notifying the operator responsive to identifying faults. Otherwise, the object identification system may proceed to act 608 and generate a label for the object. For example, the object identification system may determine whether the printed object is off-color by identifying a color of the object based on the information received from the imaging device 102 and comparing the identified color to a color associated with the model of the identified object. In this example, the object identification system may proceed to act 614 responsive to determining that the printed object is off-color and, otherwise, proceed to act 608. As another example, the object identification system may determine whether the printed object is defective by comparing a model (e.g., a point cloud model) of the printed object generated based on information from the imaging device 102 with a model of the identified object to identify discrepancies. In this example, the object identification system may proceed to act 614 responsive to determining that the printed object is defective and, otherwise, proceed to act 608.

In act 614, the object identification system may notify the operator of the defective printed object. For example, the object identification system may display a notification to the operator via a user interface of the computer system 104. The notification may include an indication of the detected faults with the printed object.

In act 616, the object identification system may send an instruction to print another copy of the defective object. For example, the object identification system may send an instruction to an external system to have another copy of the identified object printed.

As discussed herein, the object identification system may determine the identity of a 3D printed object based at least in part on information generated by an imaging device, such as a scanner or camera. One illustrative example of an object identification process is illustrative object identification process 700 shown in FIG. 7. Process 700 may be performed by any suitable object identification system such as, for example, object identification systems 100A and 100B, which are described herein with reference to FIGS. 1A and 1B.

In act 702, the computer system 104 may receive information from the imaging device 102. The information may include information indicative of various features of the object 112, such as the shape and/or color of the object 112. In some embodiments, the computer system 104 may receive captured images of the object 112 from imaging sensor 108 and generate a model (e.g., a point cloud model) based on the received captured images. In other embodiments, the computer system 104 may receive a model of the object 112 from the imaging device 102 generated by, for example, controller 110. The model of the object 112 may be indicative of the contours of at least a portion of the external surface of the object 112. For example, the model of the object 112 may be indicative of the contours of the object 112 that are in the field of view of the imaging device 102.

In act 704, the computer system 104 may identify features of the object 112 based on information received in act 702. The features may include, for example, shape characteristics descriptive of the shape of the object 112. For example, the computer system 104 may generate a model (e.g., a point cloud model) of the object 112 based on information from the imaging device 102 and identify various shape characteristics from the model of the object 112. An example set of shape characteristics that may be identified from a point cloud model of the object 112 is shown below in Table 1.

TABLE 1

| Shape Characteristic Description | Label |
| --- | --- |
| The distance between the center of a model to a point | D1 |
| The distance between two points | D2 |
| The square root of the area of the triangle between three points | D3 |
| The cubic root of the volume of a tetrahedron between four points | D4 |
| The angle between three points | A3 |

In some embodiments, each shape characteristic shown in Table 1 above may include multiple values. For example, the model of the object 112 may be a point cloud model including a plurality of points and the shape characteristic D1 may include the distance between the center of the model and each of the plurality of points in the model. In this example, the calculated distances for shape characteristic D1 may be organized by frequency of occurrence, such as in a histogram, for subsequent comparison.

It should be appreciated that the features identified by the computer system 104 is not limited to shape characteristics. For example, the computer system 104 may identify the color of the object 112 and/or the weight of the object 112.

In act 706, the computer system 104 may identify reference sets of features each descriptive of a respective object from a set of objects including the object 112. For example, the computer system 104 may identify a reference set of features for each of the objects that were assigned to be printed in the same tray as the object 112. The computer system 104 may pre-filter the objects to generate the reference sets of features that are only descriptive of objects that are likely to match the object 112. An example of such a pre-filtering process is shown in greater detail below with reference to FIG. 8. The features in each reference set of features may include the same (or similar) features as those calculated for the printed object in act 704, such as the shape characteristics shown above in Table 1, and be organized in a similar fashion.

In act 708, the computer system 104 may compare the features descriptive of the object 112 with the reference sets of features descriptive of the plurality of objects identified in act 706. For example, the computer system 104 may determine a distance between the features descriptive of the object 112 with each reference set of features associated with a respective object of the plurality of objects to determine the likeness of each object of the plurality of objects to the object 112. The computer system 104 may perform the feature comparison by any of a variety of methods. In some embodiments, the features may include the shape characteristics shown in Table 1. In these embodiments, the computer system 104 may compare a shape characteristic by comparing distribution of values and/or histograms associated with the shape characteristic. For example, the computer system 104 may compare a shape characteristic by determining a distance (e.g., a Chi-Square distance, a Bhattacharyya distance) between a distribution of values and/or histogram for the shape characteristic of the object 112 with a distribution of values and/or histogram for the same shape characteristic of one of the plurality of objects. In other examples, the computer system 104 may compare the shape characteristics by identifying the intersection of and/or the correlation between a distribution of values and/or histogram for the shape characteristic of the object 112 with a distribution of values and/or histogram for the same shape characteristic of one of the plurality of objects. The results of the feature comparison may be represented as one or more score values. An example set of scores that may be determined for the shape characteristics shown in Table 1 is shown below in Table 2.

TABLE 2

| Score Description | Score Label |
|---|---|
| Score for comparison between D1 histogram of scan and model | s_D1 |
| Score for comparison between D2 histogram of scan and model | s_D2 |
| Score for comparison between D3 histogram of scan and model | s_D3 |

TABLE 2-continued

| Score Description | Score Label |
|---|---|
| Score for comparison between D4 histogram of scan and model | s_D4 |
| Maximum of s_D1, s_D2, s_D3, s_D4 and s_A3 | s_Max |
| Minimum of s_D1, s_D2, s_D3, s_D4 and s_A3 | s_Min |
| Mean of s_D1, s_D2, s_D3, s_D4 and s_A3 | s_Mean |

In one example for illustration of act 708, the object 112 may be a pyramid and the objects printed in the tray may be a pyramid and a sphere. In this example, the computer system 104 may compare a histogram of the shape characteristic D1 derived from the model of the object 112 with a histogram of the same shape characteristic D1 for the pyramid to generate a first s_D1 score. The computer system 104 may also compare the histogram of the shape characteristic D1 derived from the model of the object 112 with a histogram of the same shape characteristic D1 for the sphere to generate a second s_D1 score. The computer system 104 may subsequently compare scores to determine that the first s_D1 score is higher than the second s_D1 score and identify the pyramid as the object 112 based on the scores.

In act 710, the computer system 104 may identify the object 112 from the plurality of objects associated with the references sets of features generated in act 706. In some embodiments, the computer system 104 may identify the object 112 with the assistance of an operator. In these embodiments, the computer system 104 may identify and display a subset of the objects associated with the references sets of features to the operator via, for example, user interface 300. The computer system 104 may select the objects in the subset by, for example, selecting the objects with the highest aggregate score and/or objects with aggregate score above a threshold. The computer system 104 may, in response, receive an indication from the operator of which object from the subset of objects is the object 112. In other embodiments, the computer system 104 may identify the object without the assistance of the operator. For example, the computer system 104 may automatically identify the object 112 as the object with the highest aggregate score.

As discussed above, the tray may include many objects that are completely different from the object that is being identified. For example, the object being identified from the tray may be a small ring while the majority of the objects in the tray may be an order of magnitude larger than the ring. Accordingly, in some embodiments, the computer system 104 may pre-filter the objects in the tray in act 706 and generate reference sets of features that only correspond to objects that are likely to match the object 112. For example, the computing device 104 may generate a bounding box that encompasses the surface of the object 112 and generate references sets of features associated only with objects that fit within the bounding box. Additionally (or alternatively), the computing device 104 may align a model of the object 112 with various objects in the same tray and generate references sets of features associated only with those objects that align well with the model of the object (e.g., have a relative and/or absolute alignment error that is below a threshold). The model of the object 112 may be aligned with various objects using any of a variety of techniques including, for example, an energy minimization method where the energy of the alignment is determined based on distance between the point cloud samples of the model, the surface of the model, and/or deformation of the point cloud samples of the model.

Figures 7, 8:
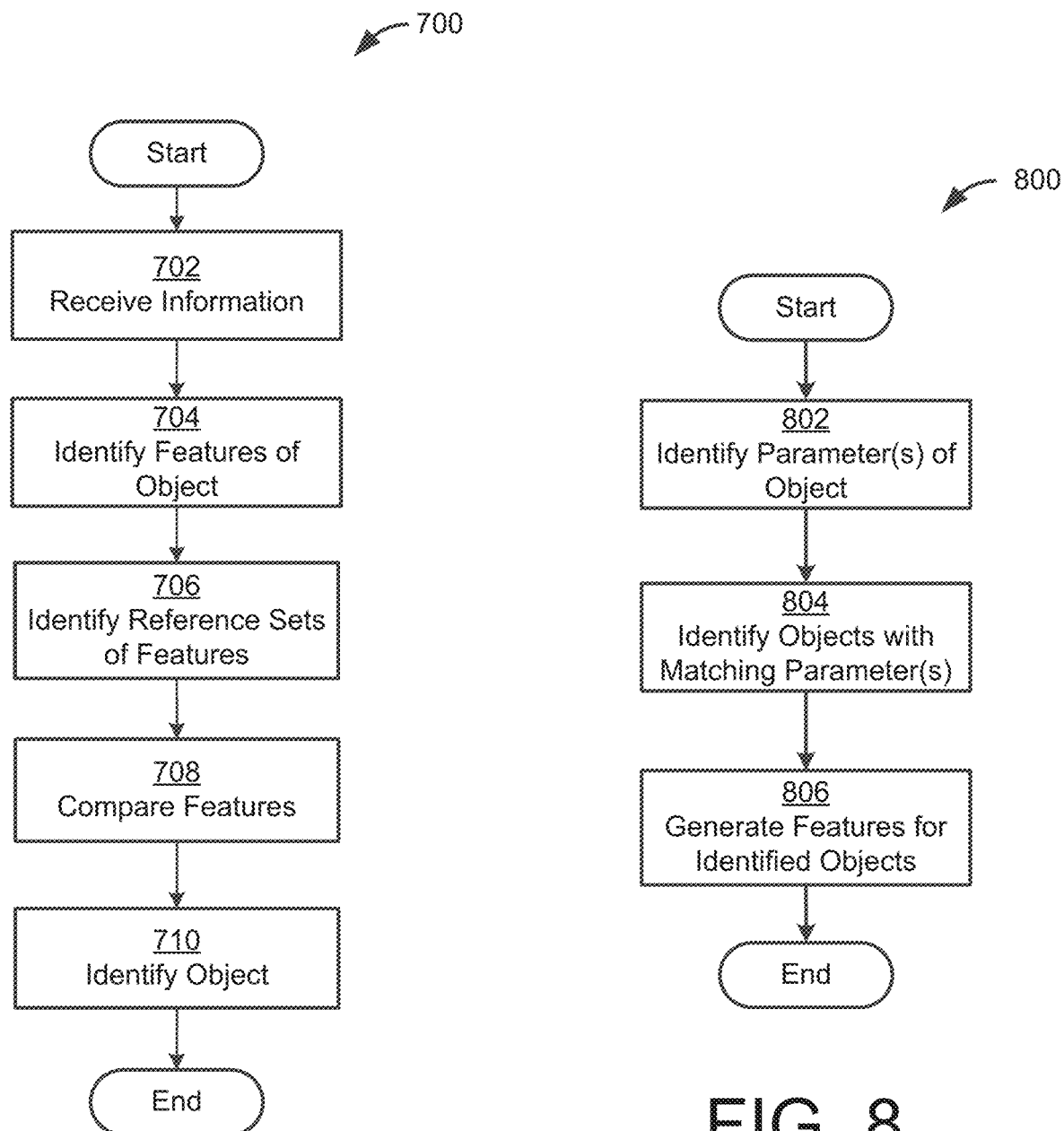
FIG. 7 is a flowchart of an example process for identifying a printed object, according to some embodiments of the technology described herein.
FIG. 8 is a flowchart of an example process for identifying reference sets of features, according to some embodiments of the technology described herein.

An example pre-filtering process that may be performed by, for example, computer system 104 is shown by process 800 in FIG. 8. In process 800, the computer system 104 identifies, for example, a set of parameters for the object 112 and generates references sets of features associated only with objects that having a matching set of parameters.

In act 802, the computer system 104 may identify one or more parameters (e.g., dimension(s)) of the object 112 based on a model of the object 112, such as point cloud model of the object 112. For example, the computer system 104 may identify any one or combination of the object parameters shown below in Table 3.

TABLE 3

| Example Object Parameter(s) |
| --- |
| Object Length |
| Object Width |
| Object Height |
| Object Volume |
| Aspect Ratio #1: Longest Side/Shortest Side |
| Aspect Ratio #2: Longest Side/Second Longest Side |
| Aspect Ratio #3: Second Longest Side/Shortest Side |
| Largest 3D Diagonal of Bounding Box |
| Bounding Box Volume |
| Object Value |
| Object Surface |
| Object Smoothness |
| Eigenvalues of a Covariance Matrix for a Point Cloud Model of the Object |

In act 804, the computer system 104 may identify a plurality of objects with parameters that match the parameters identified in act 802. For example, the computer system 104 may compare the identified parameters from the object 112 with the parameters of objects that were printed in the tray from which the object 112 originated. The computer system 104 may identify objects as matching objects responsive to the values of the parameters deviating by no more than a predetermined percentage (e.g., 5%) from the parameters determined in act 802.

In act 806, the computer system 104 may generate a reference set of features for each of the objects identified in act 804. Thereby, the computer system 104 may perform the feature comparison with fewer references sets of features to reduce the computational complexity of performing the comparison in, for example, act 708 in FIG. 7. The generation of the reference sets of features may be performed in a similar fashion as described above with reference to act 706 in FIG. 7.

Figure 9:
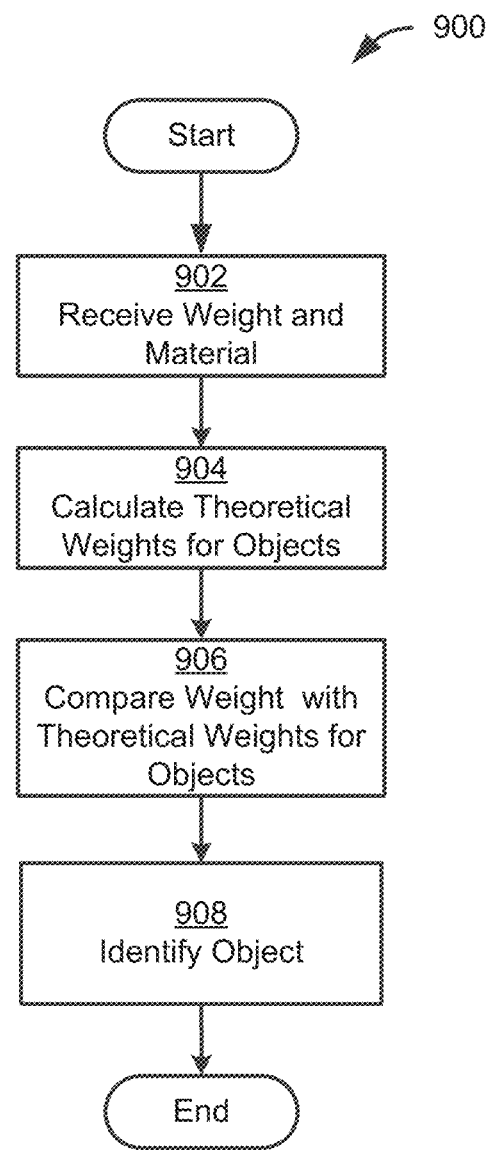
FIG. 9 is a flowchart of another example process for identifying a printed object, according to some embodiments of the technology described herein.

It should be appreciated that the printed objects may be identified using information other than information received from an imaging device, such as imaging device 102. For example, the printed object may be identified based on a weight of the printed object. An example weight-based object identification process that may be performed by, for example, the computer system 104 in object identification system 100B is shown in FIG. 9 by process 900. The weight-based object identification process 900 calculates theoretical weights for models based on, for example, the volume of material in the model (if printed) and the density of the material. These theoretical weights may be compared with the received weight to identify models matching models.

In act 902, the computer system 104 may receive an indication of the weight of the object 112 and the material used to print the object 112. For example, the computer system 104 may receive the weight of the object 112 from the scale 116 and receive the indication of the material used to print the object 112 an external system, such as the 3D printer that printed the object 112.

In act 904, the computer system 104 may calculate theoretical weights for a plurality of objects including the object 112. For example, the computer system 104 may generate theoretical weights for all of the objects in the tray from which the object 112 originated. The computer system 104 may calculate the theoretical weights of the objects by, for example, identifying a volume of material in the object and multiplying the identified volume by a density of the material received in act 902.

In act 906, the computer system 104 may compare the theoretical weights calculated in act 904 with the weight received in act 902. For example, the computer system 104 may determine the deviation between the theoretical weights and the weight of the object 112 to identify the closest theoretical weights.

In act 908, the computer system 104 identifies a matching object from the plurality of objects associated with the theoretical weights. For example, the object associated with theoretical weight that has the closest match to the received weight may be identified as matching the object 112. In other examples, the computer system 104 may identify the object with the assistance of an operator. In these examples, the computer system 104 may display a subset of the plurality of objects that have the closest theoretical weights to the object 112 to the operator via, for example, a user interface. The computer system 104 may, in turn, receive an indication from the operator of which object from the subset of objects is the object 112.

It should be appreciated that various alterations to the process 900 may be made without departing from the scope of the present disclosure. Further, additional processes may be performed to identify the objects based on weight as are described in U.S. Pat. No. 9,245,061, titled "WEIGHT-BASED IDENTIFICATION OF THREE DIMENSIONAL PRINTED PARTS," issued Jan. 26, 2016, which is incorporated by reference in its entirety.

Figure 10:
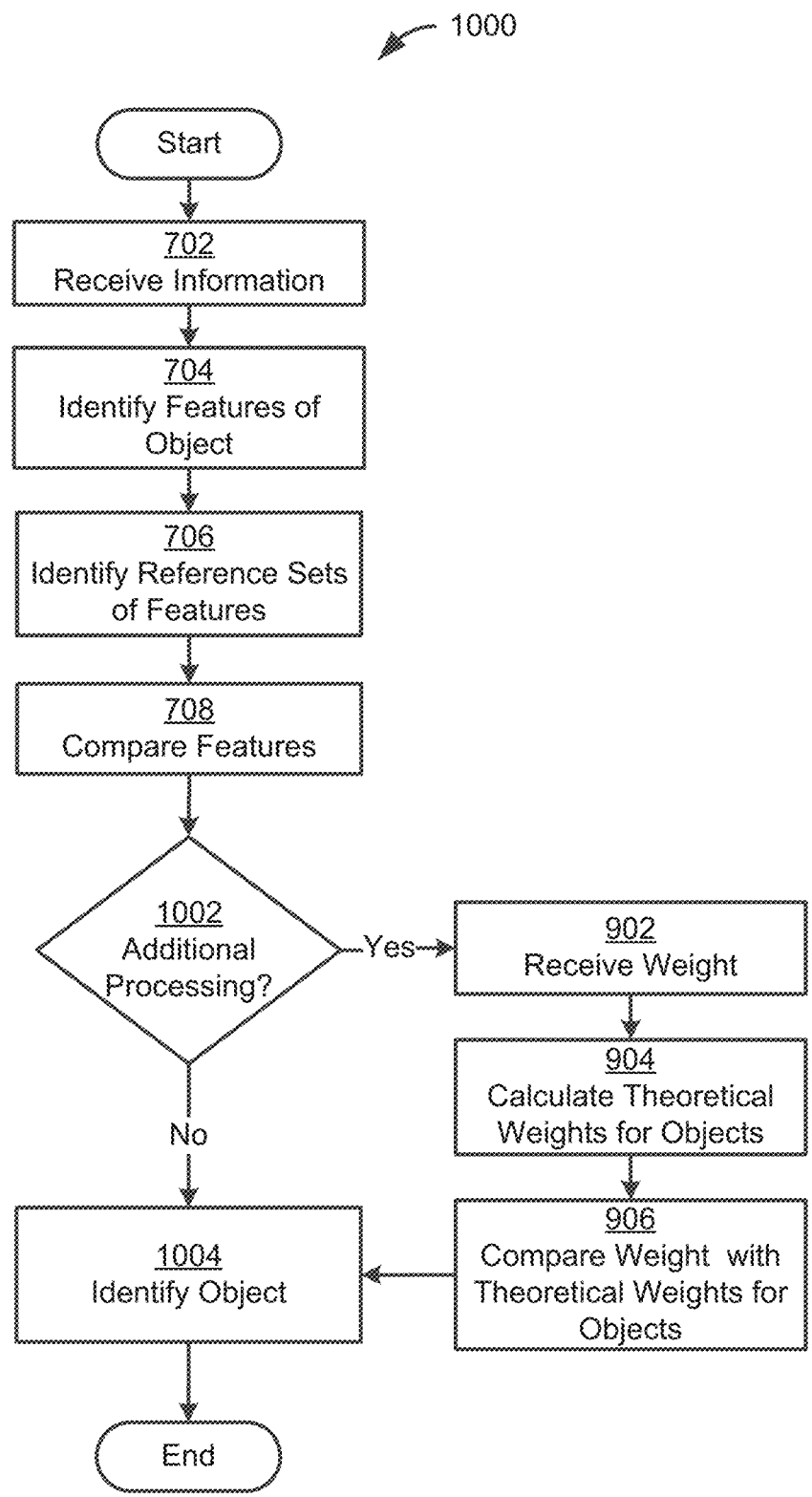
FIG. 10 is a flowchart of another example process for identifying a printed object, according to some embodiments of the technology described herein.

In some embodiments, the weight-based object identification process 900 may be combined with the visual object identification process 700. For example, the object identification system may perform acts 702-708 of FIG. 7 to generate a subset of objects that are likely candidates and subsequently perform acts 902-906 to validate the results. In another example, the object identification system may perform the acts of the visual object identification process in FIG. 7 and perform the acts of the weight-based object identification in FIG. 9 if the confidence of the resulting identified object is below a threshold. Such an example process that may be performed by, for example, the computer system 104 is shown in FIG. 10 by process 1000. The computer system 104 may perform acts 702-708 in a similar fashion as described above with reference to FIG. 7 to generate scores indicating the likeness of the object 112 to each of a plurality of objects. In act 1002, the computer system 104 may determine whether additional processing is needed prior to identifying an object in 1004. For example, the computer system 104 may analyze the scores values generated in act 710 and determine that additional processing is needed responsive to, for example, the highest score value being below a threshold and/or the difference in score value between the top results being below a threshold. If the computer system 104 determines that additional processing is needed, the computer system 104 proceeds to perform acts 902-906 to compare the weight of the object 112 with theoretical weights. The computer system 104 may perform acts 902-906 in a similar (or same) fashion as described above with reference to FIG. 9. Otherwise, the computer system 104 proceeds to act 1004 and identifies a match for the object 112 based on the scores generated in act 710 and/or the deviation between the weight of the object and various theoretical weights determined in act 906.

It should be appreciated that various alterations may be made to FIG. 10 without departing from the scope of the present disclosure. For example, the weight-based object identification may be performed first (as opposed to the visual sorting) in some embodiments. In these embodiments, the computer system 104 may perform visual object identification if the computer system 104 determines that additional processing is needed.

The processes described above are illustrative embodiments and are not intended to limit the scope of the present disclosure. The acts in the processes described above may be ordered in any suitable way. Accordingly, embodiments may be constructed in which acts are performed in an order different than illustrated, which may include performing some acts simultaneously, even though shown as sequential acts in illustrative embodiments.

In some embodiments, a special-purpose computer system (e.g., computer system 104 shown in FIGS. 1A and 1B) can be specially configured as disclosed herein to identify printed objects. The operations described herein can also be encoded as software executing on hardware that may define a processing component, define portions of a special purpose computer, reside on an individual special-purpose computer, and/or reside on multiple special-purpose computers.

Figure 11:
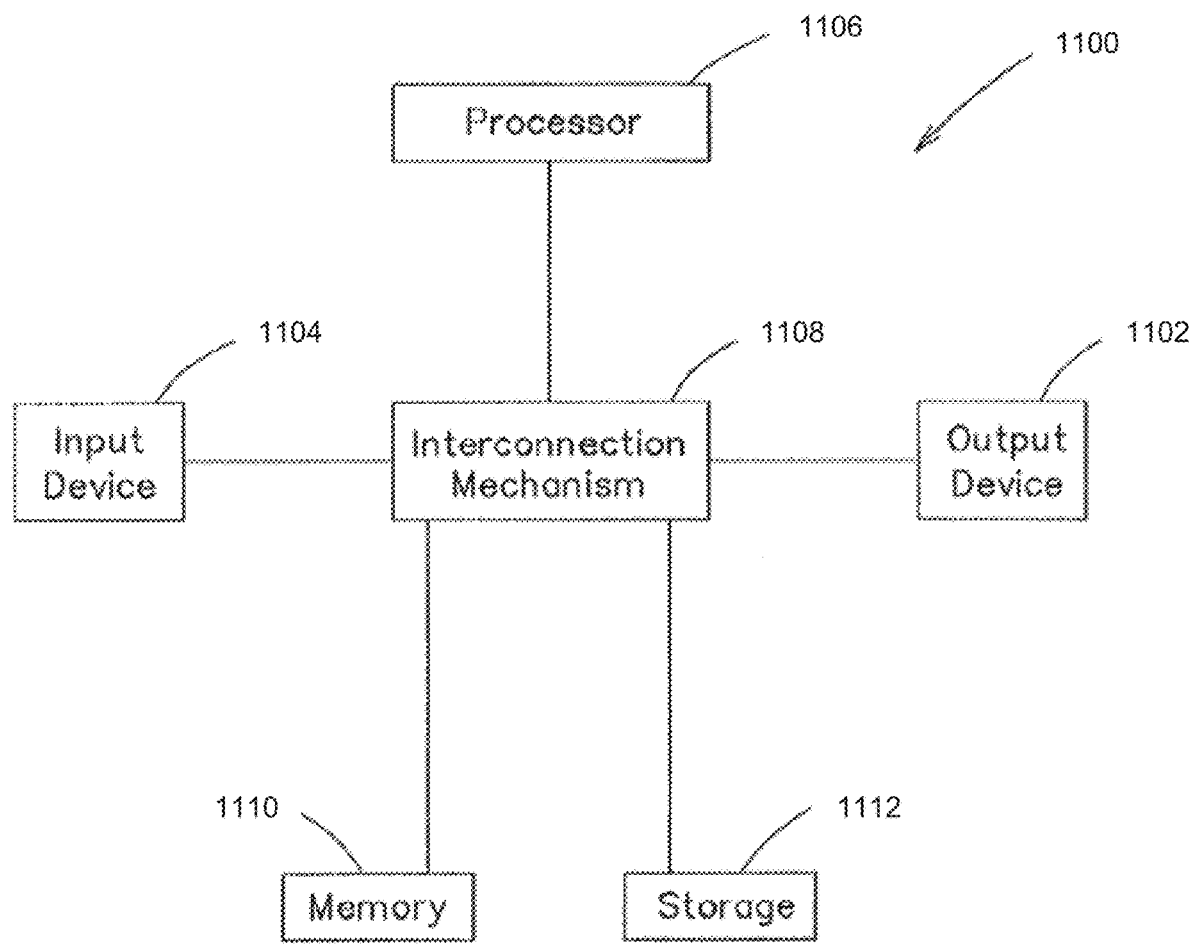
FIG. 11 is a block diagram of an example special-purpose computer system, according to some embodiments of the technology described herein.

FIG. 11 shows a block diagram of an example special-purpose computer system 1100 which may perform various processes described herein including any of the processes illustrated above in FIGS. 6-10. As shown in FIG. 11, the computer system 1100 includes a processor 1106 connected to a memory device 1110 and a storage device 1112. The processor 1106 may manipulate data within the memory 1110 and copy the data to storage 1112 after processing is completed. The memory 1110 may be used for storing programs and data during operation of the computer system 1100. Storage 1112 may include a computer readable and writeable nonvolatile recording medium in which computer executable instructions are stored that define a program to be executed by the processor 1106. According to one embodiment, storage 1112 comprises a non-transient storage medium (e.g., a non-transitory computer readable medium) on which computer executable instructions are retained.

Components of computer system 1100 can be coupled by an interconnection mechanism 1108, which may include one or more busses (e.g., between components that are integrated within a same machine) and/or a network (e.g., between components that reside on separate discrete machines). The interconnection mechanism enables communications (e.g., data, instructions) to be exchanged between system components of system 1100. The computer system 1100 may also include one or more input/output (I/O) devices 1102 and 1104, for example, a keyboard, mouse, trackball, microphone, touch screen, a printing device, display screen, speaker, etc. to facilitate communication with other systems and/or a user.

The computer system 1100 may include specially-programmed, special-purpose hardware, for example, an application-specific integrated circuit (ASIC). Aspects of the present disclosure can be implemented in software, hardware or firmware, or any combination thereof. Although computer system 1100 is shown by way of example, as one type of computer system upon which various aspects of the present disclosure can be practiced, it should be appreciated that aspects of the present disclosure are not limited to being implemented on the computer system as shown in FIG. 11. Various aspects of the present disclosure can be practiced on one or more computers having a different architectures or components than that shown in FIG. 11.

Various embodiments described above can be implemented using an object-oriented programming language, such as Java, C++, Ada, or C # (C-Sharp). Other programming languages may also be used. Alternatively, functional, scripting, and/or logical programming languages can be used. Various aspects of the present disclosure can be implemented in a non-programmed environment (e.g., documents created in HTML, XML or other format that, when viewed in a window of a browser program, render aspects of a graphical-user interface (GUI) or perform other functions). The system libraries of the programming languages are incorporated herein by reference. Various aspects of the present disclosure can be implemented as programmed or non-programmed elements, or any combination thereof.

It should be appreciated that various embodiments can be implemented by more than one computer system. For instance, the system can be a distributed system (e.g., client server, multi-tier system) that includes multiple special-purpose computer systems. These systems can be distributed among a communication system such as the Internet.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Further, some actions are described as taken by a "user" or "operator." It should be appreciated that a "user" or "operator" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having described above several aspects of at least one embodiment, it is to be appreciated various alterations, modifications, and improvements will readily occur to those skilled in the art. Such alterations, modifications, and improvements are intended to be object of this disclosure. Accordingly, the foregoing description and drawings are by way of example only.

What is claimed is:
1. A system, comprising:
an imaging device configured to image a first three-dimensional (3D) printed object; and a processor coupled to the imaging device and configured to:
  after completion of printing:
    receive information generated as a result of imaging the first 3D printed object with the imaging device;
    identify a first set of features for the first 3D printed object using the received information;
    compare the first set of features with multiple reference sets of features, each of the multiple reference sets of features being associated with a respective 3D object in a first plurality of 3D objects;
    identify, based at least in part on results of the comparison, a 3D object from the first plurality of 3D objects that matches the first 3D printed object; and
    determine whether the first 3D printed object is defective based on comparing the information generated as a result of imaging the first 3D printed object with the imaging device and a model of the identified 3D object from the first plurality of 3D objects that matches the first 3D printed object.

2. The system of claim 1, wherein the processor is further configured to compare the first set of features with the multiple references sets of features at least in part by determining a distance between the first set of features and each of the multiple reference sets of features.

3. The system of claim 1, wherein the processor is further configured to:
  identify the 3D object at least in part by selecting a subset of the first plurality of 3D objects based on results of the comparison,
  cause the subset of the first plurality of 3D objects to be displayed, and
  receive a selection of the identified 3D object from the first plurality of 3D objects that matches the first 3D printed object.

4. The system of claim 3, wherein the processor is further configured to order 3D objects in the subset of the first plurality of 3D objects based on a measure of distance between the first set of features and each of the multiple reference sets of features.

5. The system of claim 1, wherein the processor is further configured to:
  receive a selection of a tray including a second plurality of 3D objects, the first 3D printed object being one of the second plurality of 3D objects; and
  identify the first plurality of 3D objects at least in part by identifying a set of 3D objects that matches the second plurality of 3D objects in the tray.

6. The system of claim 1, further comprising a label generator coupled to the processor and wherein the processor is further configured to instruct the label generator to create a label for the first 3D printed object.

7. The system of claim 6, wherein the label includes a smart tag, the label generator includes a smart tag writer, and the smart tag writer is configured to write information identifying the first 3D printed object to the smart tag.

8. The system of claim 1, wherein the imaging device is further configured to image a second 3D printed object and wherein the processor is further configured to:
  remove the identified 3D object from the first plurality of 3D objects to form a second plurality of 3D objects;
  receive second information generated as a result of imaging the second 3D printed object with the imaging device;
  identify a second set of features for the second 3D printed object using the received second information;
  compare the second set of features with multiple second reference sets of features, each of the multiple second reference sets of features being associated with a respective 3D object in the second plurality of 3D objects; and
  identify, based at least in part on results of the comparison, a 3D object from the second plurality of 3D objects that matches the second 3D printed object.

9. The system of claim 1, wherein:
  the information includes a point cloud model of at least a portion of the first 3D printed object,
  the first set of features includes a shape characteristic of the first 3D printed object,
  each of the multiple reference sets of features is associated with the respective 3D object in the first plurality of 3D objects and includes a shape characteristic of the respective 3D object, and
  the shape characteristic of the first 3D printed object is selected from the group consisting of a distance between a center point and another point in the point cloud model, a distance between two points in the point cloud model, an area of a triangle formed by three points in the point cloud model, a volume of a tetrahedron formed by four points in the point cloud model, and an angle formed by three points in the point cloud model.

10. The system of claim 9, wherein the processor is further configured to send an instruction to an external system to have another copy of the identified 3D object from the first plurality of 3D objects that matches the first 3D printed object printed by a 3D printer responsive to a determination that the first 3D printed object is defective.

11. A method, comprising:
  after completion of printing:
    imaging a three-dimensional (3D) printed object using an imaging device;
    identifying a set of features from information generated as a result of the imaging;
    comparing the set of features with multiple reference sets of features;
    identifying, based at least in part on results of the comparison, a 3D object from a first plurality of 3D objects that matches the 3D printed object; and
    determining whether the 3D printed object is defective based on comparing the information generated as a result of imaging the 3D printed object with the imaging device and a model of the identified 3D object from the first plurality of 3D objects that matches the 3D printed object.

12. The method of claim 11, wherein comparing the set of features with the multiple references sets of features includes determining a distance between the set of features and each of the multiple reference sets of features.

13. The method of claim 11, wherein identifying the 3D object includes:
  selecting a subset of the first plurality of 3D objects based on the comparison;
  displaying the subset of the first plurality of 3D objects; and
  receiving a selection of the identified 3D object from the first plurality of 3D objects that matches the 3D printed object.

14. The method of claim 13, wherein identifying the 3D object includes ordering 3D objects in the subset of the first plurality of 3D objects based on a measure of distance between the set of features and each of the multiple reference sets of features.

15. The method of claim 11, further comprising:
receiving a selection of a tray including a second plurality of 3D objects, the 3D printed object being one of the second plurality of 3D objects; and
identifying the first plurality of 3D objects at least in part by identifying a set of 3D objects that matches the second plurality of 3D objects in the tray.

16. The method of claim 11, further comprising creating a label for the 3D printed object.

17. The method of claim 16, wherein the label comprises a smart tag, and wherein creating the label for the 3D printed object includes writing information identifying the 3D printed object to the smart tag.

18. The method of claim 11, wherein:
the set of features includes a shape characteristic,
the information includes a point cloud model of at least a portion of the 3D printed object,
each of the multiple reference sets of features is associated with a respective 3D object in the first plurality of 3D objects and includes a shape characteristic of the respective 3D object, and
the shape characteristic of the 3D printed object is selected from the group consisting of: a distance between a center point and another point in the point cloud model, a distance between two points in the point cloud model, an area of a triangle formed by three points in the point cloud model, a volume of a tetrahedron formed by four points in the point cloud model, and an angle formed by three points in the point cloud model.

19. At least one non-transitory computer-readable storage medium storing processor-executable instructions that, when executed by at least one processor, cause the at least one processor to:
after completion of printing:
image a three-dimensional (3D) printed object using an imaging device;
identify a set of features from information generated as a result of the imaging;
compare the set of features with multiple reference sets of features;
identify, based at least in part on results of the comparison, a 3D object from a plurality of 3D objects that matches the 3D printed object; and
determine whether the 3D printed object is defective based on comparing the information generated as a result of imaging the 3D printed object with the imaging device and a model of the identified 3D object from the first plurality of 3D objects that matches the 3D printed object.

* * * * *

UNITED STATES PATENT AND TRADEMARK OFFICE
CERTIFICATE OF CORRECTION

PATENT NO. : 11,040,491 B2
APPLICATION NO. : 15/787461
DATED : June 22, 2021
INVENTOR(S) : Daphne Marlies Laméris et al.

Page 1 of 1

It is certified that error appears in the above-identified patent and that said Letters Patent is hereby corrected as shown below:

In the Claims

At Column 22, Claim 19, Line 26, the text "object from the first plurality of 3D objects that" should read -- object from the plurality of 3D objects that --.

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*